(12) United States Patent
Villaret

(10) Patent No.: US 12,553,748 B2
(45) Date of Patent: Feb. 17, 2026

(54) HIGH RESOLUTION ABSOLUTE VECTOR ENCODER

(71) Applicant: MOTX Ltd., Givat Shmuel (IL)

(72) Inventor: Yves Villaret, Hadera (IL)

(73) Assignee: MOTX Ltd., Givat Shmuel (IL)

( * ) Notice: Subject to any disclaimer, the term of this patent is extended or adjusted under 35 U.S.C. 154(b) by 73 days.

(21) Appl. No.: 18/275,642

(22) PCT Filed: Feb. 3, 2022

(86) PCT No.: PCT/IL2022/050150
§ 371 (c)(1),
(2) Date: Aug. 3, 2023

(87) PCT Pub. No.: WO2022/168095
PCT Pub. Date: Aug. 11, 2022

(65) Prior Publication Data
US 2024/0192031 A1   Jun. 13, 2024

Related U.S. Application Data

(60) Provisional application No. 63/145,002, filed on Feb. 3, 2021.

(51) Int. Cl.
*G01D 5/249* (2006.01)
*G01D 5/14* (2006.01)
*G01D 5/347* (2006.01)

(52) U.S. Cl.
CPC ......... *G01D 5/2492* (2013.01); *G01D 5/2497* (2013.01); *G01D 5/34776* (2013.01);
(Continued)

(58) Field of Classification Search
CPC .... G01D 5/145; G01D 5/2492; G01D 5/2497; G01D 5/34776; G01D 5/34779; G01D 2205/18; G01D 2205/24; G01D 2205/26
See application file for complete search history.

(56) References Cited

U.S. PATENT DOCUMENTS 7,263,453 B1 *  8/2007  Gansler ............. G01D 5/24457
                                                        702/104
11,573,075 B1 *  2/2023  Wiegman ............. H02P 29/028
(Continued)

FOREIGN PATENT DOCUMENTS

WO  WO 2020/149989   7/2020
WO  WO 2022/168095   8/2022

OTHER PUBLICATIONS

International Search Report and the Written Opinion Dated May 12, 2022 From the International Searching Authority Re. Application No. PCT/IL2022/050150. (12 Pages).
(Continued)

*Primary Examiner* — Steven L Yeninas

(57) ABSTRACT

A high-resolution encoder device to measure and retrievably encode the relative position of a first part P with a second part S comprises sensible elements on part P, said sensible elements providing a variable property for sensing, such that said variable property varies over a length of said part P, a number n of sensors for sensing said variable property, said sensors being separate from each other and disposed on part S, said sensors configured to output signals in accordance with said sensing, and a processing unit connected to receive said signals from each of said n sensors and configured for succeeding ones of said relative positions to form a vector having entries from each sensor respectively, the vector defining said relative positions respectively.

25 Claims, 7 Drawing Sheets

(52) U.S. Cl.
CPC ......... *G01D 5/145* (2013.01); *G01D 2205/18* (2021.05); *G01D 2205/24* (2021.05); *G01D 2205/26* (2021.05)

(56) References Cited

U.S. PATENT DOCUMENTS

| | | | |
|---|---|---|---|
| 2010/0114518 A1 | 5/2010 | Lindberg | |
| 2018/0080796 A1* | 3/2018 | Roos | .................... H02K 11/215 |
| 2019/0056241 A1* | 2/2019 | Vuillermet | ............. G01D 5/165 |
| 2019/0195660 A1 | 6/2019 | Villaret et al. | |
| 2023/0160721 A1* | 5/2023 | Plainer | ................... G06F 17/17 |
| | | | 324/207.11 |

OTHER PUBLICATIONS

Supplementary European Search Report and the European Search Opinion Dated Nov. 11, 2024 From the European Patent Office Re. Application No. 22749372.3. (8 Pages).

* cited by examiner

HIGH RESOLUTION ABSOLUTE VECTOR ENCODER

RELATED APPLICATIONS

This application is a National Phase of PCT Patent Application No. PCT/IL2022/050150 having International filing date of Feb. 3, 2022, which claims the benefit of priority under 35 USC § 119(e) of U.S. Provisional Patent Application No. 63/145,002 filed on Feb. 3, 2021. The contents of the above applications are all incorporated by reference as if fully set forth herein in their entirety.

FIELD AND BACKGROUND OF THE INVENTION

The present invention relates to encoder devices (encoders), and more particularly but not exclusively to high resolution absolute vector encoders.

Encoders are used to measure the angular position of a rotating element, or the relative displacement of sliding elements; they are typically used in control systems, often referred as servo systems, where a motion controller is used to cause a moving element to follow a precise desired path. For that purpose, encoder devices include an electronic interface which allows their connection to a motion controller.

An encoder may be of two types, rotary and linear. Rotary encoders are designed to measure the angular position of a rotary element, like the shaft of a motor or any rotating device. Linear encoders are designed to measure the relative movement of two sliding elements, for example a sliding carriage mounted on a linear bearing relative to a static base.

In a common application, a rotary encoder is mounted on an electrical motor shaft at the rear end, and provides position information about the shaft rotation angle to the electric motor controller. The position information may be provided at a high rate. The motor controller may then output a current to the motor in order to make it rotate toward the desired position.

In another common application, a linear encoder is mounted on the moving element of a linear motor, and is connected to the linear motor motion controller.

In the scope of this patent application, the term "encoder device" is used to refer either to a rotary or to a linear encoder. A linear encoder is constructed by using the same components as a rotary encoder, and disposing these components on a linear path. The linear path is divided into a number of consecutive equal length sections referred to herein as periods. In a first implementation, encoder components are disposed along one period in a similar way to the disposition of these components on a circular path. In other implementations, the components can be disposed over several periods, provided that the distance of each component from the position of the same component in the first implementation is equal to an integer number of periods.

In automatic machinery, it is often required that moving elements follow a path with very high precision, and at high speed. To achieve this, the encoder device must be designed with high precision, and should be able to transfer position information at a high rate. As an example, commercially available rotary encoders can provide precision better than 0.01 degrees, and the rate of transfer of the rotation angle value to a motion controller is typically between 8,000 to 30,000 value transfers per second.

Another parameter for designing an encoder device is its resolution. The resolution represents the smallest position change that the encoder device is able to measure in one turn or in one length unit, and is usually expressed in number of position values per turn or linear distance. The smallest position change defined by the resolution is usually smaller than the precision, meaning that the encoder device is able to provide a position value having more significant digits than required for the precision, even if the position value output differs from the actual position by some error, this error being smaller than that defined by the precision characteristic of the encoder. High resolution allows motion controllers, also called servo controllers, to achieve tight and smooth control of the moving elements.

Encoder devices may be absolute or Incremental. An absolute encoder device is able to measure the angular or linear position relative to a fixed reference position, while an incremental encoder device is only capable of measuring the angular or linear displacement from the start of its operation. Thus, when an incremental encoder device is used in automatic machinery, it is common to execute, at each start of operation of the machine, a search for a reference position. This search is done at slow speed in a given direction, until a limit switch or other device placed at the reference position is activated. This search procedure adds complexity to the system, and delays initial operation of the machine. In spite of this drawback, incremental encoders are commonly used, due to their simplicity and their low cost. In many cases, a machine builder would have preferred to use an absolute encoder, but makes use of an incremental encoder due to the higher cost of presently available absolute encoders.

It is desirable to provide an absolute encoder device, which is of simple fabrication and provide high precision and resolution at a low cost.

In U.S. Pat. No. 9,007,057 by Villaret, issued Apr. 14, 2015, there is described an absolute encoder device of simple construction, that can provide absolute position information with high resolution. The device makes use of a number n of analog sensors, equally distributed on a circumference. On a static part; a rotating disc, having sections of alternating properties on an annular track according to a specific pattern, is placed so that the sensors can sense the property of the section of track in proximity. During disc rotation, different sections of the rotating disc come into proximity with each sensor. Each sensor electrical signal is first digitized to provide a bit value 1 or 0; Bit values of all sensors are then combined into a digital word to create a unique code value for each rotating disc angular range position. In a second step, one of the n sensors is selected and its analog output value is used to calculate a high-resolution position value.

An advantage of the above-mentioned patent is the simplicity of the device. Since sensors are equally distributed on a circular line, the distance between sensors is relatively large and commercially available sensors of normal size can be used.

The term "sectors" is defined in the above-mentioned patent as being angular portions of an encoder rotating disc circular track, all sectors being of approximately equal angular size. Each sector of the track is made of material having a first or a second property, according to a predefined pattern.

A first requirement of the above-mentioned patent is that the code is monovalent, i.e. that a code value is obtained only on the range of one sector.

A second requirement is that the code should be a Gray code, i.e. during movement, the transition from one sector to the neighbor sector will result in the change of only one bit of the digital code. This is required in order to avoid code errors during transition.

Both above requirements may be achieved using a pattern designed according to method described in U.S. Pat. No. 8,492,704 by Villaret and granted 23 Jul. 2013.

These two requirements result in practical implementation limitations, as explained below:

Overall achievable resolution of the encoder according to U.S. Pat. No. 9,007,057 is roughly equal to the resolution of the digital code multiplied by the resolution of the analog sensors signals.

For the purpose of increasing resolution, either a) the resolution of the analog sensor reading or b) the resolution of the digital code needs to be increased.

Regarding a), practical resolution of standard Analog sensors and Analog to digital converters is limited by the electrical noise. In particular, a high-resolution encoder is also required to provide the position value within a very short time, thus requiring a high-speed Analog to digital converter. Increasing resolution thus becomes very difficult and impractical.

Regarding b), increasing resolution of the digital code may be achieved by increasing the number of sensors and changing the pattern, according to U.S. Pat. No. 8,492,704 by Villaret. However, when increasing the number of sensors n, the code resolution obtained becomes very inefficient, i.e. the number of codes becomes a smaller fraction of the number of possible code values $2^n$. For example, with n=7 sensors, it is possible to find practical patterns providing 98 code values. Using n=8 sensors, a practical pattern can provide only 128 code values. So, while the number of sensors increases, gain in resolution is small. In another aspect, for the example of n=7 sensors, a practical pattern can be found that defines sections extending over a relative large number of sectors, so that they can be easily implemented with elements of relative large size, for example with magnets. For a higher number of sensors, sections of the pattern have much smaller size and become impractical for implementation, requiring miniature components, and may become particularly impractical for magnets.

It is thus desired to design an encoder which does not have the above-described limitations in the pattern design, for the purpose of further increasing the resolution.

SUMMARY OF THE INVENTION

Thus, it is an object of the present invention to provide an encoder device able to provide higher resolution.

Accordingly, it is a principal object of the present invention to provide a high-resolution encoder device having sensors preferably sufficiently distant from each other so that commercially available sensors can be used. An encoder device according to the present embodiments may make use of sensors providing an analog output and may include a memory and processing means in order to obtain a high absolute resolution, not limited by the number of sensors.

An encoder according to the present embodiments may include two parts, wherein the two parts are relatively moveable along a circular path in the case of a rotary encoder, or along a linear path in the case of a linear encoder. It must be understood that "linear" here includes any curvilinear shape and is not restricted to a linear straight line. In addition, the encoder includes a processing unit able to receive a number of analog signals inputs, and to output a position value.

In the scope of this document, we designate the two encoder parts as part P and part S for simplicity of understanding.

According to an aspect of some embodiments of the present invention there is provided a high-resolution encoder device to measure and retrievably encode the relative position of a first part P with a second part S comprising:

a) sensible elements on part P, the sensible elements providing a variable property for sensing, such that the variable property varies over a length of the part P;

b) a number n of sensors for sensing the variable property, the sensors being separate from each other and disposed on part S, the sensors configured to output signals in accordance with the sensing;

c) a processing unit connected to receive the signals from each of the n sensors and configured for succeeding ones of the relative positions to form a vector having entries from each sensor respectively, thereby defining the relative positions respectively; and the processing unit being configured to calculate the relative position from the vector.

The encoder may comprise an analog to digital converter between the n sensors and the processor, to digitize the signals from the n sensors prior to providing the signals to the processor.

In embodiments, the signals are input to the processing unit as a vector $A_s(X)$ with $s \in \{1 \ldots n\}$.

In embodiments, the vectors are inserted into an n vector function $V(X) = \{ \ldots, A_s(X), \ldots \}$ to define the relative positions X of the P part with the S part.

In embodiments, the vector function V(X) is selected to fulfil first and second mathematical conditions:

first mathematical condition_There is a one to one (injective) relation between X and V(X), so that a vector value V(X) obtained at a position X is characteristic of that position.

second mathematical condition_There exists a threshold Δ such that for any two positions X1 and X2, there exists a norm $N[V(X_1), V(X_2)]$ and a function $F[V(X_1), V(X_2)]$ such that Either $$N[V(X_1), V(X_2)] < \Delta$$

Or

The function $F(X) = F[V(X_1), V(X_2)]$ is monotonous over a predetermined interval $X1 \leq X \leq X2$.

In embodiments, the vector function V(X) is of size p and has components $V(X) = \{ \ldots, B_t(X), \ldots \}$ with $t \in \{1 \ldots p\}$, wherein the components $B_t(X)$ are mathematical combinations of signals $A_s(X)$.

In embodiments, the variable property is one member of the group consisting of:

a variable magnetic field intensity resulting from permanent magnets of different polarities disposed on the scale at several positions;

a variable light intensity obtained by variable transparency or reflectivity of parts of the scale; and a number of light sources a variable light intensity obtained by variable distance between sensors and a number of light sources variable eddy current losses obtained by an irregular shape of a conducting part of the scale; and variable inductance obtained by a variable property of the rotor material magnetic properties.

One embodiment is a rotary encoder, and the relative position comprises a relative angle.

Another embodiment is a linear encoder. One of the parts comprises a liner path or a curvilinear path and the relative position relates to a length along the linear or curvilinear path.

In embodiments, the processor is configured to obtain an initial position estimate from a most recent previously known position.

The encoder may obtain an initial position by scanning for all possible positions until a position at which the vector function satisfies a condition $$N[Vc(X)-V]<\Delta$$

is found, wherein $\Delta$ is a predetermined threshold.

In embodiments, values of the vector function are held in a look-up table.

According to a second aspect of the present invention there is provided a high-resolution encoding method to measure and retrievably encode the relative position of a first part P with a second part S comprising:
a) providing a variable property for sensing such that the variable property varies over a length of the part P, the variable property being provided via sensible elements;
b) on part S, sensing the variable property at n discrete locations;
c) outputting signals from the n discrete locations in accordance with the sensing;
d) receiving the signals from each of the n discrete locations; and
e) for succeeding ones of the relative positions forming a vector having entries from each sensor respectively, thereby defining the relative positions respectively, the encoder thereby using the vector to measure and encode the relative position.

Embodiments may involve digitizing the signals from the n sensors prior to providing the signals to the processor.

Embodiments may involve inputting the signals to the processing unit as a vector $A_s(X)$ with $s\in\{1\ldots n\}$.

Embodiments may involve inserting the respective vector into an n vector function $V(X)=\{\ldots, A_s(X), \ldots\}$ of the relative position X of the P part with the S part.

In embodiments, the vector function V(X) is selected to fulfil two mathematical conditions:
first mathematical condition_There is a one to one (injective) relation between X and V(X), so that a vector value V(X) obtained at a position X is characteristic of that position.
second mathematical condition_There exists a threshold $\Delta$ such that for any two positions X1 and X2, there exists a norm $N[V(X_1), V(X_2)]$ and a function $F[V(X_1), V(X_2)]$ such that
Either $$N[V(X_1),V(X_2)]<\Delta$$

Or

The function $F(X)=F[V(X_1), V(X_2)]$ is monotonous over a predetermined interval $X1\leq X\leq X2$.

In embodiments, the vector function V(X) is of size p and has components $V(X)=\{\ldots, B_t(X), \ldots\}$ with $t\in\{1\ldots p\}$, wherein the components $B_t(X)$ are mathematical combinations of signals $A_s(X)$.

In embodiments, the variable property is one of the following:
a variable magnetic field intensity resulting from permanent magnets of different polarities disposed on the scale at several positions;
a variable light intensity obtained by variable transparency or reflectivity of parts of the scale; and a number of light sources
a variable light intensity obtained by variable distance between sensors and a number of light sources; variable eddy current losses obtained by an irregular shape of a conducting part of the scale; and
variable inductance obtained by a variable property of the rotor material magnetic properties.

Embodiments may involve carrying out a function search for a vector function, the function search comprising:
selecting locations on the part P and placing or simulating sensible elements at the locations on the part P;
selecting locations on the part S and placing or simulating sensors at the locations on the part S;
calculating or providing signals from each sensor; and
testing the signals to provide a candidate vector function that fulfills the conditions; and
accepting the candidate vector function if the conditions are fulfilled and repeating the function search if the conditions are not fulfilled.

The relative position comprises a relative angle in the case of a rotor. Alternatively, one of the parts comprises a liner path or a curvilinear path and the relative position relates to a length along the linear or curvilinear path.

Embodiments may involve obtaining an initial position estimate from a most recent previously known position.

Embodiments may involve obtaining an initial position by scanning for all possible positions until a position at which the vector function satisfies a condition $$N[Vc(X)-V]<\Delta$$

is found, wherein $\Delta$ is a predetermined threshold.

Embodiments may involve obtaining values of the vector function from a look-up table.

Embodiments may involve carrying out an initialization procedure, the initialization procedure comprising compiling the vector function from the variable property.

The initiation procedure may further comprise:
selecting a candidate property and a variation for the variable property;
using a simulation of the candidate property and the variation to set up the vector function; and
verifying that the vector function fulfils the first and second conditions.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
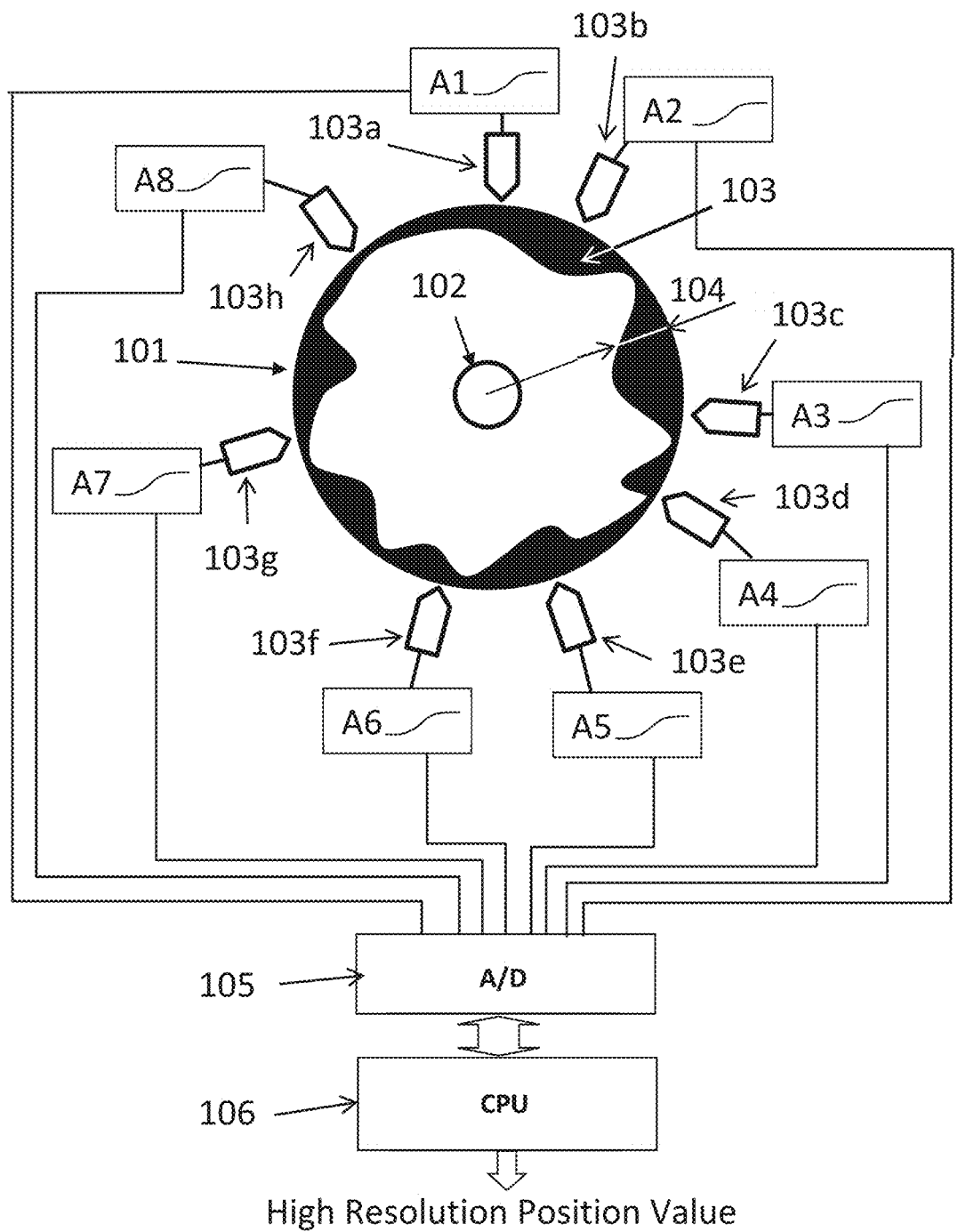
FIG. 1 is a simplified diagram that shows a one-turn absolute encoder according to embodiments of the present invention.

The present embodiments relate to a high resolution absolute value vector encoder.

An encoder according to the present embodiments is provided to measure the relative position X of the two parts, part P and part S. According to the specific application, part P may be static and part S moving along a path or part S may be static and part P moving along a path.

A pattern function is defined and is arranged on a track on the P part of the encoder. This track is linear for a linear encoder, or circular for a rotary encoder, and the property of the track varies along it according to the pattern defined in the pattern function. The pattern is such as to result in a continuously variable property along the track. The property varying along the position on the track may be any one of many suitable properties, able to be sensed by appropriate sensors respectively. For example:

a) variable magnetic polarization, sensible by a hall sensors or magnetic sensors,
b) variable transparency, reflectivity or optical polarization, sensible by optical sensors
c) variable conductivity, sensible by eddy current sensors
d) inductance, sensible by electronic devices This list is non-limiting, and other pairings of properties and sensors may be considered by the skilled person and are to be regarded as being within the scope of the present patent.

A number n of sensors is disposed along and in proximity to the track on encoder part S, at defined positions, to sense the property of the track. During the relative movement of the two parts P and S along the path the sensors move along and in proximity to the patterned track. Each sensor outputs an analog signal which varies with the relative position X of the two encoder parts, according to the property of the track portion in proximity with it. Each sensor output is amplified and/or conditioned by an electronic circuit and input to a processing unit as an analog value $A_s(X)$.

At each position X, there are thus n values available, and the number n of values of $A_{[s]n}(X)$ provide a vector $V(X)= \{ \ldots, A_{[s]n}(X), \ldots \}$ of dimension n.

According to the present embodiments, the pattern and the position of the n sensors are designed to give the following mathematical properties of the vector V.

Condition a)_There is a one to one (injective) relation between X and V(X), so that a vector value V(X) obtained at a position X is characteristic of that position.

Condition b)_There exists a threshold $\Delta$ such that for any two positions X1 and X2, there exists a norm $N[V(X_1), V(X_2)]$ and a function $F[V(X_1), V(X_2)]$ such that Either $$N[V(X_1)-V(X_2)] > \Delta$$

Or

The function $F(X)=F[X, V(X_2)]$ is monotonous for X1≤X≤X2

Previous to the first operation, the encoder undergoes a calibration procedure during which the values V(X) are recorded and stored in a memory of the processing unit, in a table of vectors $V_c(X_i)$.

Based on the above two properties, an algorithm is run in the processing unit to evaluate the relative position $X_0$ of P relative to S.

At a position $X_0$ the vector has a value $A=V(X_0)$.

The search algorithm is made in two steps:

Step 1: Search for a position X such that:

$$N[V(X)-A] \leq \Delta$$

To make this search, a table of the pre-recorded values of $V_c(X)$ is used. Various search methods may be used to optimize this step.

Step 2: evaluate F(X, A)

Step 3: Decrease or increase X until $F(X, A) \simeq F(X, V_c(X))$, or $V_c(X) \simeq A$ Step 3 is made possible by the fact that F(X, A) is monotonous, according to the condition b)_defined above. The search is then done in the direction, increase or decrease X, that minimize the difference $\|F(X, A)-F(X, V_c(X))\|$.

The obtained value of $X_1$ then represents a measure of the actual position X and is output by the processing unit.

This algorithm is run in the processing unit and, as will be shown, can be optimized and run cyclically at high speed, so that the encoder of the present embodiments may output measured position at a high rate. For example, a rate of 30,000 measured positions per second may be achieved with presently available microprocessors.

A first advantage of the encoder of this invention is its simplicity. The encoder may be designed with sensors relatively distant from each other, so that standard discrete electronic components of low cost can be used.

A second advantage is that high precision is not required during the manufacturing process. By contrast, in the prior art citations discussed above, precision may be such that the pre-defined code is obtained, and the position range for each code may be approximately the same for each code in order to maintain the required precision or resolution.

A third advantage, is that the pattern can be designed with a large number of elements of variable properties. Analog signals may present rapidly increasing or decreasing sections favorable for high resolution position measurements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1 which is a simplified diagram of an embodiment according to the present invention of an encoder. An encoder rotor shown in FIG. 1 as a disc 101, fixed to a rotating shaft 102, includes at its outer circumference, a track 103 having a variable property. The track variable property is shown here as a black annular shape of variable radial width indicated by arrow 104. The variable property is not necessarily a width of an annular shape but is shown as such herein for simplicity to illustrate more clearly the continuously varying property as a function of the disc rotation angle.

The variable property may be of many kinds such as, for example:

Variable magnetic field intensity resulting from permanent magnets of different polarities disposed on the rotor at multiple positions Variable light intensity obtained by variable transparency or reflectivity of parts of the rotor and a number of light sources Variable light intensity obtained by variant distance between sensors and a number of light sources Variable eddy current losses obtained by the irregular shape of a rotating rotor and a number of high frequency electric coils Variable inductance obtained by a variable property of the rotor material magnetic properties.

The above list is non-limiting, and other types of properties and sensors may be conceived in the scope of this patent.

Eight sensors 103a-103h are static and placed in positions to sense the variable property of the rotating disc 101. The sensors 103a-103h output electrical analog signals respectively A1-A8. The output of the sensor varies continuously with the rotation angle according to the varying property.

The analog signals A1-A8 are input to an analog to digital converter 105 and their analog values are then input to a processing unit (CPU, 106). The CPU 106 then cyclically processes the signals value A1-A8 value according to the method described further herein, and outputs a high-resolution position value.

Depending on the type of properties used, specific geometric configurations of the encoder can be used, not limited to a configuration with a disc and sensors in proximity used here. In the scope of this patent, any configuration can be used wherein a number of sensors, each one sensing a variable property of the rotating part (rotor) of the encoder, output analog electric signals varying with the rotation angle of the shaft.

According to an encoder of the present embodiments, a continuous variable property is designed so that the vector $V(X)$ formed by the signals A1-A8, $V(X)=\{ \ldots , A_s(X), \ldots \}$ fulfill the two following conditions over the whole range of angular positions X:

Condition a)_There is a one to one (injective) relation between X and $V(X)$, so that a vector value $V(X)$ obtained at a position X is characteristic of that position.

Condition b)_There exists a threshold $\Delta$ such that for any two positions X1 and X2, there exists a norm $N[V(X_1), V(X_2)]$ and a function $F[V(X_1), V(X_2)]$ such that Either $$N[V(X_1)-V(X_2)]>\Delta$$

Or

The function $F(X)=F[V(X), V(X_2)]$ is monotonous for $X1 \leq X \leq X2$

Figure 2A:
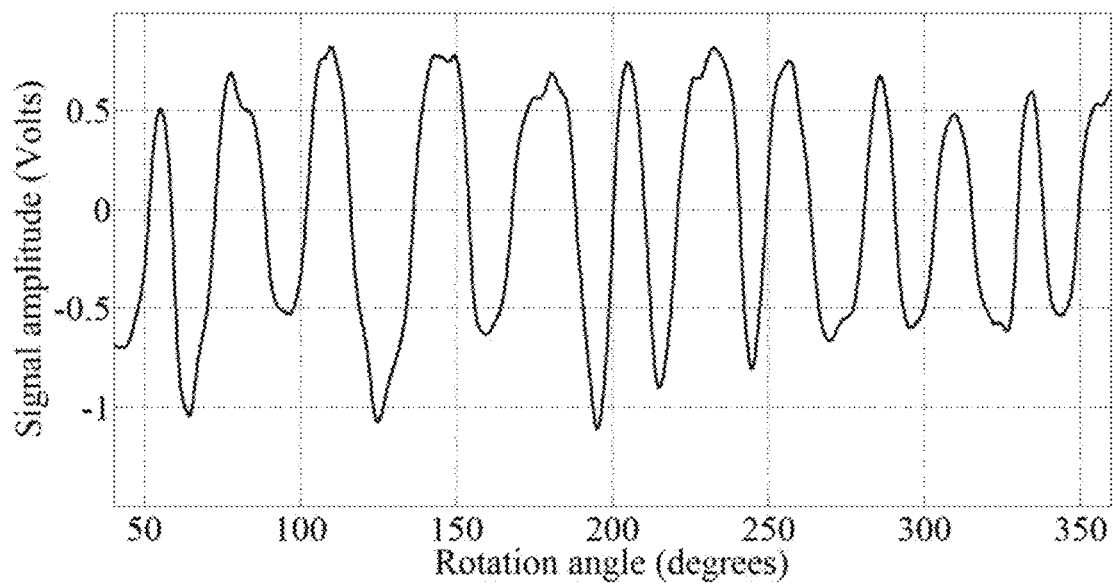
FIG. 2a is a simplified diagram showing an example of an analog signal variation as a function of rotation angle according to embodiments of the present invention.
Figure 2B:
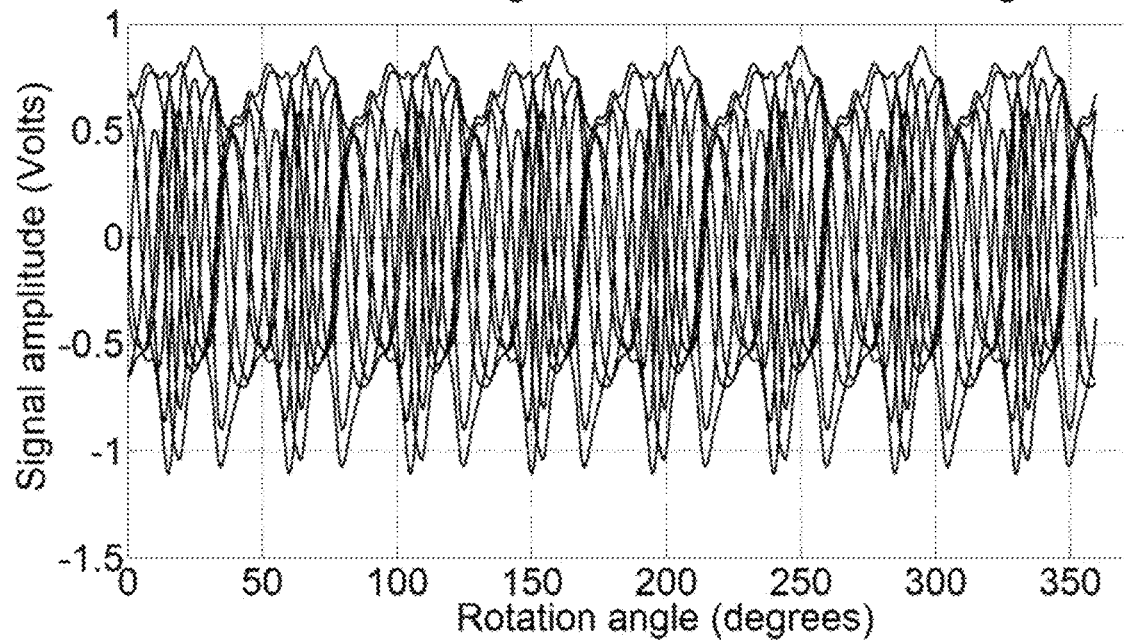
FIG. 2b shows all analog signals according to an embodiment of the present invention on the same plot.

Reference is now made to FIGS. 2A and 2B, which are two plots of typical sensor input according to the present embodiments. In FIG. 2a is shown an example of a single sensor signal input to the CPU after amplification and analog to digital conversion, and FIG. 2b shows 8 signals output by 8 sensors on the same plot.

Previous to initial operation, the encoder of the present embodiments undergoes a calibration procedure. During that calibration procedure, the values of the vector V of the analog signals An are recorded and stored in tables in the CPU memory over the full range of positions over a turn with sufficient resolution. Vector values retrieved from these tables in the CPU memory are hereinbelow further referred as $V_c$. Optionally, vector derivative $$\frac{dV_c(X)}{dX},$$

where X is the angular position, can also be recorded and stored in CPU memory.

In the described embodiment, the norm N chosen is the square root of the signal difference squared:

$$N[V(X_1)-V(X_2)]=\sqrt{(V(X_1)-V(X_2))^2}$$

Figure 3A:
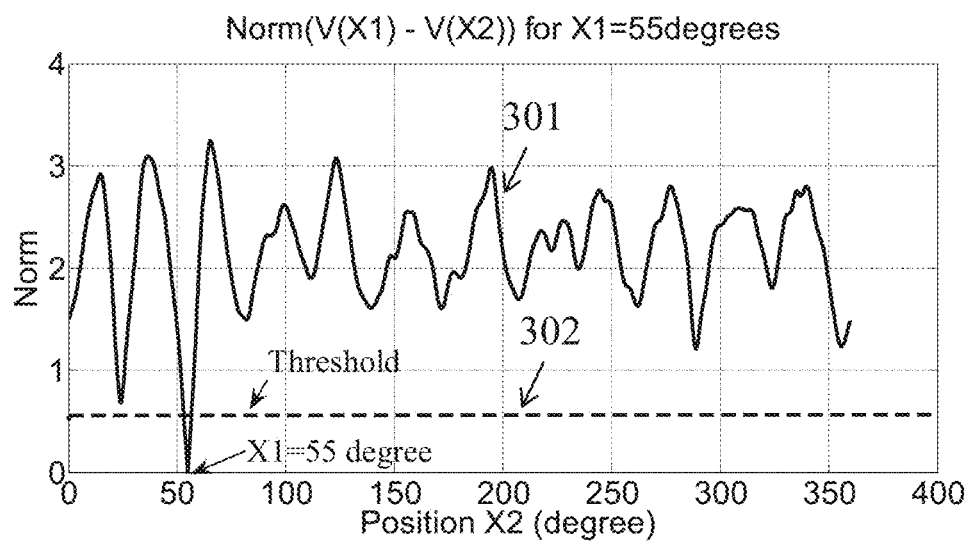
FIG. 3a shows the variation of the norm of the difference $N[V(X_1)-V(X_2)]$ for a fixed value $X_1$ and all values of $X_2$ according to an embodiment of the present invention.
Figure 3B:
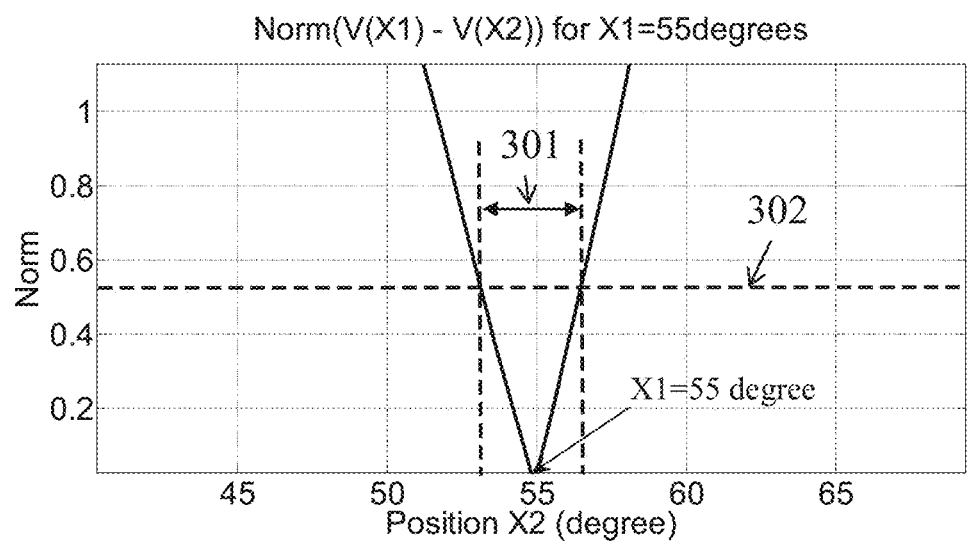
FIG. 3b is an enlarged view of the same around the fixed value of $X_1$.

Reference is now made to FIG. 3a, which illustrates a plot of norm against angular position. More particularly, the value of the norm $N[V(X_1)-V(X_2)]$ for a given position $X_1=55$ degrees and for positions $X_2$ in the full range of rotation (360 degrees) is plotted. The position 55 degrees is just given as an example for explanation purpose, any other position could be used for this purpose. As can be seen, the norm has a higher value than the threshold $\Delta$ (302) in the full range of angles of $X_2$, except in a narrow range around the $X_1=55$ degrees. The pattern is designed to ensure that, for any angular position $X_1$, the collection of all positions $X_2$ such that $N[V(X_1), V(X_2)]<\Delta$ forms a unique continuous segment of positions. This is a mathematical consequence of the condition b). The segment, having width 301, is shown in FIG. 3b, which is an enlarged view of the graph of FIG. 3a around the $X_1=55$ degrees position. Preferably, the pattern should be designed so that the threshold $\Delta$ is significantly higher than the resolution and the noise level of the analog signals output by the sensors. The algorithm run by the CPU initially searches for positions X such that $N[Vc(X)-V]<\Delta$, where $Vc(X)$ is the vector of values of the analog output at position X retrieved from tables of pre-recorded data. These tables are recorded in the calibration procedure applied before first operation of the encoder as explained above.

For such an initial search, a simple searching procedure may be to scan the whole range with a step smaller than the smallest width of a segment such as segment 301. However, such a procedure is time consuming, and another searching procedure that can be run at high speed is described hereinbelow.

Now considering condition b), in the present embodiment, the function F is selected and defined by the scalar vector multiplication:

$$F[X, V] = (V_c(X) - V) * \frac{dV_c(X)}{dX} \quad \text{(equation 1)}$$

where
V is the vector formed by the signals A1-A8
$V_c(X)$ is the vector retrieved from the calibration table at entry point X $$\frac{dV_c(X)}{dX}$$

derivative at X is calculated by the CPU using values retrieved from the calibration tables, or from tables prerecorded during the calibration procedure.

Figure 4:
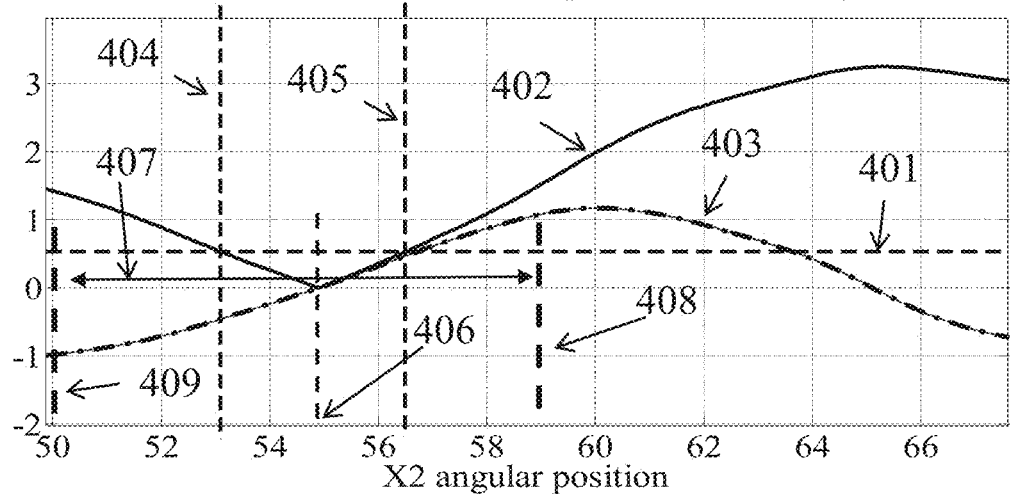
FIG. 4 shows the variation of the norm of the difference $N[V(X_1)-V(X_2)]$ and the function F for a fixed value $X_1$ and values of $X_2$ around $X_1$ (55 degrees) according to an embodiment of the present invention.

Reference is now made to FIG. 4, which illustrates an exemplary plot showing the variation of the function F around the position $X_1$=55 degrees (406). In this graph, it is seen that the function F (403) is monotonous in the range of positions $X_2$ for which the norm $N[V(X_1)-V(X_2)]<\Delta$ is smaller than the threshold $\Delta$ (401). This range is marked by the two vertical lines 404 and 405.

The value $d=F(X, V)-F(X, V_c(X))$, represents a distance between position X and the actual angular position of the encoder $X_1$. Many common iteration algorithms can then be used which result in a precise estimation of the encoder position $X_1$, starting for the position X found during the first algorithm step.

For the particular F function selected in the present embodiment, the F function reaches a null (0) value when $X=X_1$.

The first search step resulted in a first position X in proximity with $X_1$ and we thus can write, in first order approximation $$V \cong V_c(X) + (X - X_1) \cdot \frac{dV_c(X)}{dX}$$

(from equation 1 above)
Multiplying this equation by $$\frac{dV_c(X)}{dX}$$

we get a first estimation of the position $X_1$ $$X_1 \cong X + \frac{F(X, V)}{\left(\frac{dV_c(X)}{dX}\right)^2} \quad \text{(equation 2)}$$

This calculation is iterated several times, each time using for X the estimated value $X_1$. These iterations converge rapidly and a very precise estimation of the actual position $X_1$ is obtained after a small number of iterations.

This iterative algorithm can be run cyclically at high speed, and the CPU can output a precise high resolution position value at a high rate.

The maximum precision achievable $\delta X$ is determined by the possible error $\delta A_s$ in the signals $A_s$ due to noise and analog to digital converter resolution, and the amplitude of the vector derivative $$\frac{dV_c(X)}{dX}$$

For a vector error $\delta V$, resulting from noise and resolution, the resulting error in position can be approximated to $$\delta X = \delta V \cdot \frac{\frac{dV_c(X)}{dX}}{\left(\frac{dV_c(X)}{dX}\right)^2}. \quad \text{(equation 3)}$$

To reduce the error in position, the encoder should thus be designed to provide a value of $$\left|\frac{dV_c(X)}{dX}\right|$$

as high as possible.

Other iterative algorithms can be conceived of that are enabled by the existence of a function F(X, V) which is monotonous at least in the range of positions $X_1$–X for which $N[Vc(X)-V]<\Delta$, wherein V is the vector formed by the values of the sensor signals output at an angular position $X_1$ of the encoder.

We have described above the continuation of the algorithm run in the CPU in order to precisely estimate the encoder angular position. The continuation is dependent on initially finding a position X for which $N[Vc(X)-V]<\Delta$, as described below.

There are two cases to consider:

In the first case, for example after powering on the encoder, the encoder's approximate position is not known. In this case a start-up procedure is defined, wherein the CPU program scans the whole range of angular positions with a step smaller than the smallest width of the segments, for example segment 301 in FIGS. 2a-b. Such a procedure is time consuming, but it is part of the encoder initialization procedure and does not affect the encoder functionality.

In the second case, a first precise estimation of the encoder angular position X is available from a previous cycle. The encoder has a limited rotation speed C, and the CPU algorithm is run within a very short cycle time, so that the actual angular position $X_1$ of the encoder rotor will be very close to the previously measured position X. If in the range (X–$X_1$) the function F(X, V) is monotonous, then the step 2 algorithm can be run, and the new position $X_1$ can be precisely estimated. CPU can thus cyclically measure the encoder angular position if the cycle time is short enough.

As an example, an encoder has a maximum speed of C=12,000 rpm, and the cycle time is dt=30 microsecond. In that example, the encoder angular position may change by C·dt=2.16 degrees within one cycle. Referring to FIG. 4, we can see that the function F(X, V) (403) is monotonous within a range of ~9 degrees (407, shown as a double arrow in the range between the two dotted lines 408, 409).

Furthermore, it is possible to calculate a position X closer to the actual position of the encoder by adding an increment proportional to the speed. In physical systems the maximum acceleration is limited, so that a speed extrapolation applied to the previously calculated position will provide a closer starting position X for the second step algorithm, and will increase the maximum speed applicable for the encoder.

Figure 5:
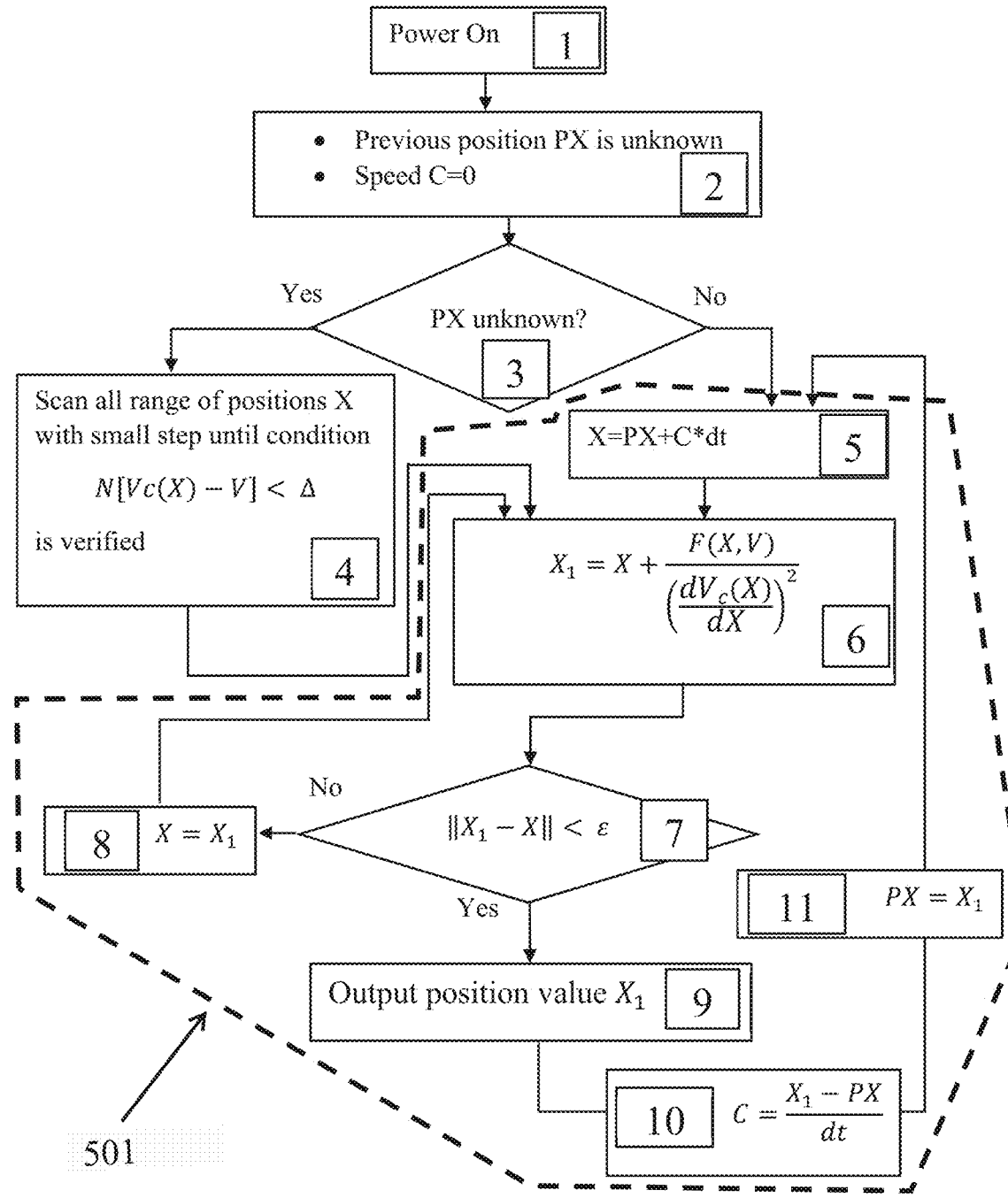
FIG. 5 is a simplified block diagram representing the flow chart for a processing unit implementing the algorithm of the encoder according to an embodiment of the present invention.

Referring to FIG. 5, a simplified flow chart illustrates the encoder algorithm described above. The flow chart blocks are numerated from 1 to 11 and the following describes the process of the CPU program implemented represented by each block.

Block 1: At encoder power on, the encoder processing unit starts at block 1 and proceeds to block 2.

Block 2:
- a variable for a previous position variable PX is defined and labelled as "unknown".
- A variable C is defined for an encoder angular velocity, and set to zero: C=0;
- Proceed to block 3

Decision Block 3:
- if previous position PX is unknown, proceed to startup procedure of block 4
- if previous position PX is known, proceed to block 5

Block 4:
- Scan all range of positions X with small step until condition $N[Vc(X)-V]<\Delta$ is verified. The step of this search is pre-defined during the calibration procedure
- Proceed to block 6

Blocks 5-11 describe the algorithm cycle, as shown by the dashed line contour 501. CPU program executes cyclically the operations of the cycle at high speed.

Block 5:
- The algorithm cycle is not the first one, a previous position is known and that known position can be used to make a first rough estimate of the present position. A speed estimation C has also been calculated from the previous cycle $C=X_1-PX/dt$. A position estimation X is then calculated by $X=PX+C*dt$.
- Proceed to Block 6

Block 6:
- A more precise estimation $X_1$ of the position is calculated by the above-described equation 2

$$X_1 = X + \frac{F(X, V)}{\left(\frac{dV_c(X)}{dX}\right)^2}$$

Proceed to decision block 7

Decision Block 7:
- In order to check whether the position estimation X1 is within the required resolution, the difference $\|X_1-X\|<\varepsilon$ is checked
  - The value $\varepsilon$ is predefined and set to a value smaller than the required resolution of the encoder.
  - Alternatively, the difference $\|V_c(X)-V\|<\delta$ can be checked.
  - The value $\delta$ is predefined according to the estimated noise level and analog to digital converters resolution.
- If $\delta$ is smaller than a predefined value $\varepsilon$, then proceed to block 9 where the value $X_1$ is output by the encoder.
- Otherwise, proceed to block 8 where the value $X_1$ is used as a new starting point for another iteration.

Block 8
- value $X_1$ is copied to X as a new starting point for the next iteration. Each iteration will thus go through blocks 6, 7, 8 until the condition of block 7 is verified. The number of iterations will be typically under 5
- Proceed back to block 6

Block 9
- The position value $X_1$ is output by the encoder
- Proceed to block 10

Block 10
- Velocity is calculated from the difference between the present position $X_1$ and a previous PX. Here dt is the cycle time, or the time difference between calculation of PX and X.
- Proceed to block 11

Block 11:
- Record position $PX=X_1$ for next cycle
- Return to Block 5 for following cycle Various searching algorithms may be thought of according to the principles of the present disclosure as summarized below:
- a)_At start (power on), first algorithm cycle, scan all the position range until a position X verifying the condition $N[Vc(X)-V]<\Delta$ is found, and use that as a starting value
- b)_If it is not a first cycle, estimate a starting position X using the previous cycle position and a physical model of the system
- c)_Make an iterative search using the monotonous function F to guide the search direction The above-described algorithm relies on the two required conditions of the variable property mentioned above:
- condition a)_There is a one to one (injective) relation between X and V(X), so that a vector value V(X) obtained at a position X is characteristic of that position.
- condition b)_There exists a threshold $\Delta$ such that for any two positions X1 and X2, there exists a norm $N[V(X_1), V(X_2)]$ and a function $F[V(X_1), V(X_2)]$ such that Either $$N[V(X_1)-V(X_2)]>\Delta$$

Or

The function $F(X)=F[X, V(X_2)]$ is monotonous for $X1 \leq X \leq X2$

As defined above, the encoder includes two parts P and S. Part P induces the variable property, which property varies with the relative movement of P and S. To produce the variable property, sensible elements may be arranged on part P according to a geometric pattern. Part S includes relatively distantly placed sensors of this variable property. The variable property thus result in a sensor output signal that varies with the relative positioning between P and S. In order to design a physical arrangement that creates such a variable property, a variable property searching method may be constructed, say using a computer.

In a computer program, Norm and function F are defined. A threshold $\Delta$ is defined to be significantly higher than the norm of the maximum noise level of the analog signals.

A variable maxdVcdt is defined and initialized to zero.

Searching for a candidate variable property fulfilling the conditions a and b may then be carried out as follows:
1: in a simulation model, arrange a number of active elements on encoder part P, and sensors on encoder part S according to a number of random dimensions or other parameters.
2: use a simulation program that calculates the resulting signals $A_s(X)$ of each sensor s and the vector $V(X)=\{\ldots, A_s(X), \ldots\}$ for all positions X 3: check if the function X→V(X) is injective (condition a), if it is not, return to step 1. In general, when using a random arrangement, the probability that the function V(X) is not injective will be very low
4: check if the condition b is verified. If not, return to 1.
5: evaluate the minimum value of $$\left|\frac{dV_c(X)}{dX}\right|, \min\left(\left|\frac{dV_c(X)}{dX}\right|\right);$$

If $$\min\left(\left|\frac{dV_c(X)}{dX}\right|\right) > maxdVcdt$$

then record the present arrangement and set $$maxdVcdt = \min\left(\left|\frac{dV_c(X)}{dX}\right|\right)$$

Return to 1.

The search may be run as long as possible to obtain a value of $$\min\left(\left|\frac{dV_c(X)}{dX}\right|\right)$$

to be as high as possible.

In 1 of the above-described searching method, random selection of a number of dimensions or parameters has been used. Other methods may be used to create a new variable property function each time. For example, artificial intelligence or neuron network techniques could be used with higher efficiency.

In the above-described embodiment, the vector V(X) was defined as the vector V(X)={ ..., $A_s(X)$, ... } where $A_s(X)$ are the sensor signals after being amplified and digitized by an analog to digital converter. However it is possible to use any mathematical combination of the $A_s(X)$ to obtain other signals; for example linear combination B(X)=M·A(X), could be used, where M is a matrix. In particular, the vector V(X)={ ... $B_n(X)$ ... } can be of dimension greater or smaller than the number of sensors.

For example, the signals of two sensors in symmetric position on the S part of a rotary encoder could be summed in one signal to compensate for eccentricity in the rotation of the shaft. In another example, normalized signals $$B_s(X) = \frac{A_s(X)}{norm(\{... A_s(X) ...\})}$$

could be used to eliminate imprecision caused by power supply fluctuations affecting all signals with the same factor.

The vector V(X)={ ... $B_n(X)$ ... } may be designed by the searching method described above to verify the same properties a and b.

Figure 6:
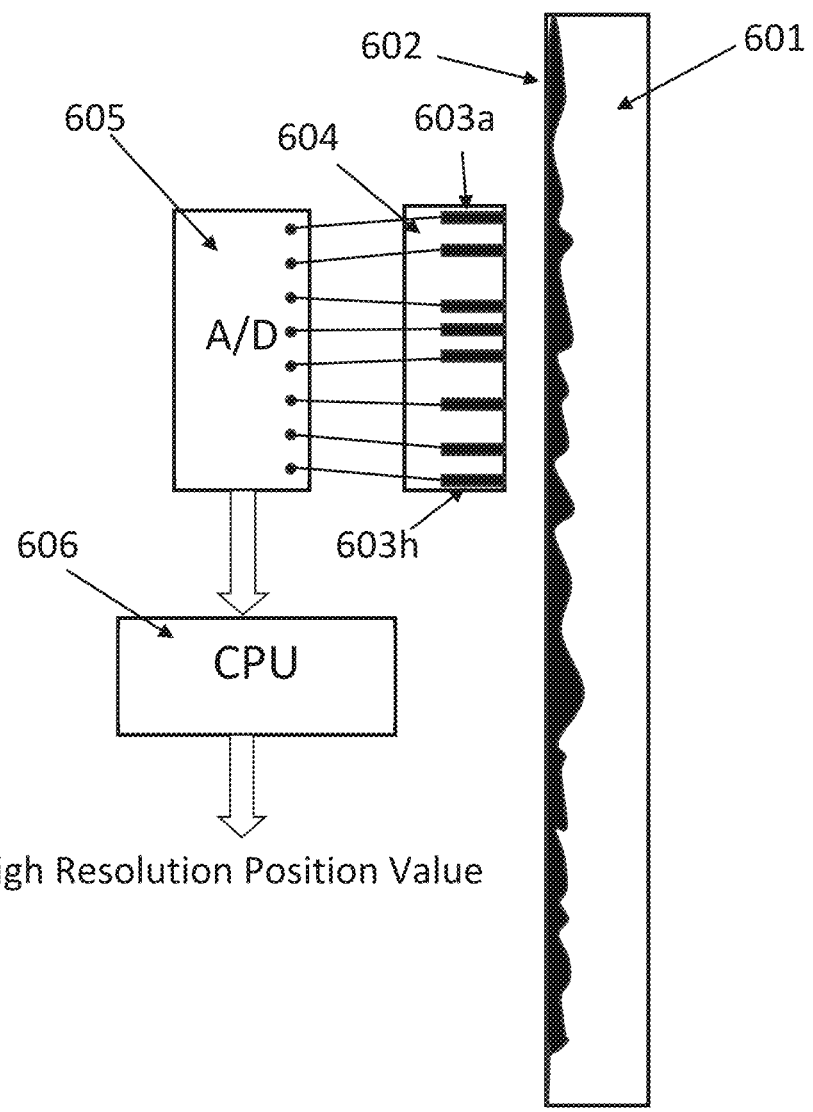
FIG. 6 schematically shows a linear encoder according to embodiments of the present invention.

Referring to FIG. 6, a linear encoder according to the present embodiments is shown. The encoder includes a linear scale 601 which constitutes the P part of the encoder. On the linear scale, a variable property 602 is induced, variable along the length of the scale, represented here as a black band of variable thickness. The variable property may be of many kinds such as, for examples:

Variable magnetic field intensity resulting from permanent magnets of different polarities disposed on the scale at several positions Variable light intensity obtained by variable transparency or reflectivity of parts of the scale and a number of light sources Variable light intensity obtained by variable distance between sensors and a number of light sources Variable eddy current losses obtained by an irregular shape of a conducting part of the scale and eddy current sensors Variable inductance obtained by a variable property of the rotor material magnetic properties.

This list is non-limiting, and other types of properties and sensors may be considered within the scope of the present patent.

An encoder head 604 may constitute the S part of the encoder. The encoder head and scale move relative to each other on a linear path. The encoder head includes eight sensors (603a-603h). Each sensor senses the variable property of the scale according to its position on the head and the head position relative to the scale.

The electric signals from these sensors are then amplified and digitized by an A/D converter (605) and transmitted to a processing unit 606 (CPU).

The variable property searching method described above is used to design the encoder variable property, and the above-described encoder algorithm is implemented by the processing unit.

An absolute linear encoder can thus be designed with a simple physical design.

Figure 7A:
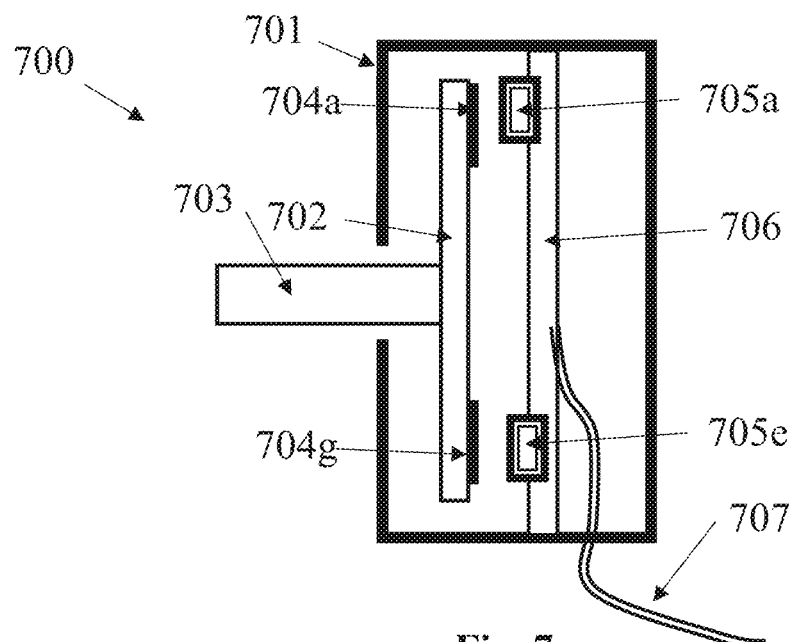
FIGS. 7a and 7b are simplified diagrams which show an implementation for a magnetic encoder according to an embodiment of the present invention.
Figure 7B:
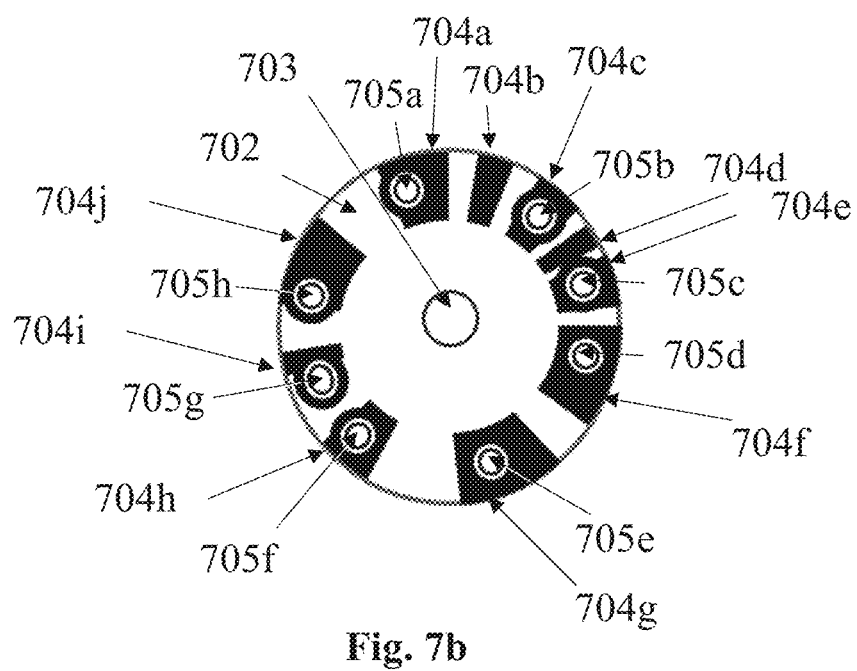

Referring now to FIGS. 7a and 7b, an implementation of a rotary encoder is shown. In FIG. 7a an axial cross section is shown. The encoder includes a shaft 703 and a disc 702 fixed to this shaft, rotatable inside a fixed encoder body 701. On the disc 702, shown in FIG. 2b, are mounted a number of permanent magnets 704a-704j at various positions. Referring to FIG. 7a again, a printed circuit board (PCB)706, fixed to the encoder body, includes magnetic sensors such as 705a, 705e. In this particular example, there are eight magnetic sensors 705a-705h. The axial position is shown in FIG. 7a for 705a and 705e, and the radial position is shown in FIG. 7b, 705a-705h. Magnetic sensors 705a-705h are placed in axial proximity to the permanent magnets 704a-704j. Due to this axial distance, the magnetic field induced in these sensors varies continuously with the rotation of the disc. The variable property searching method described above is used to design the size and position of the magnets to induce the variable magnetic field in the magnetic which will result in magnetic sensors having electric signals which fulfil the above required conditions a and b.

In this particular example, 13 permanent magnets 704a-704j are positioned on the circumference of the disc. A random sizing and positioning of these permanent magnets thus implies 13 parameters. The variable property searching method described above may run cyclically, and in each cycle, may select 13 parameter values for the position and size of the permanent magnets and run a simulation program to analyze the sensor signals.

On the PCB 706 are mounted an analog to digital converter and a processing unit (not shown) to run the encoder algorithm and output the angular position value through electrical wires 707.

An absolute magnetic encoder of high resolution and very simple construction can thus be manufactured at low cost.

In this document, the terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A high-resolution encoder device to measure and retrievably encode the relative position of a first part P of said encoder device with a second part S of said encoder device, said first part P and said second part S being movable with respect to one another, comprising:
    a) sensible elements disposed along a length of said first part P of said encoder device, said sensible elements providing a variable property for sensing said relative motion, such that said variable property varies over said length of said first part P;
    b) a number n of sensors for sensing said variable property, said sensors being separate from each other and disposed along said second part S, said sensors configured to output signals in accordance with said sensing of said variable property;
    c) a processing unit connected to receive said signals from each of said n sensors and configured for succeeding ones of relative positions along said first part P to form a vector V having entries from each sensor respectively, thereby defining said relative positions respectively; and the processing unit being configured to calculate the relative position from the vector; the processing unit further being configured to obtain an initial position by scanning for all possible positions until a position at which the vector function satisfies a condition $$N[Vc(X)-V]<\Delta$$

is found, wherein $\Delta$ is a predetermined threshold, N is a normalization function, $Vc(X)$ is the vector of values of the analog output at position X retrieved from tables of pre-recorded data, said position satisfying said condition being usable to track said relative position.

2. The high resolution encoder of claim 1, further comprising an analog to digital converter between said n sensors and said processor, to digitize said signals from said n sensors prior to providing said signals to said processor.

3. The high resolution encoder of claim 1, wherein said signals are input to the said processing unit as a vector $V(X)=\{\ldots, A_s(X), \ldots\}$ with $s \in \{1 \ldots n\}$.

4. The high resolution encoder of claim 3, wherein said vector is inserted into an n vector function $V(X)=\{\ldots, A_s(X), \ldots\}$ to define the relative positions X of the said P part with the said S part.

5. The high-resolution encoder of claim 4, wherein said vector function $V(X)$ is selected to fulfil first and second mathematical conditions:
    first mathematical condition_There is a one to one (injective) relation between X and $V(X)$, so that a vector value $V(X)$ obtained at a position X is characteristic of that position,
    second mathematical condition_There exists a threshold $\Delta$ such that for any two positions X1 and X2, there exists a norm $N[V(X_1), V(X_2)]$ and a function $F[V(X_1), V(X_2)]$ such that
    Either $$N[V(X_1),V(X_2)]<\Delta$$

Or
    The function $F(X)=F[V(X_1), V(X_2)]$ is monotonous over a predetermined interval $X1 \leq X \leq X2$.

6. The high resolution encoder of claim 1 wherein the vector function $V(X)$ is of size p and has components $V(X)=\{\ldots, B_t(X), \ldots\}$ with $t \in \{1 \ldots p\}$, wherein the components $B_t(X)$ are mathematical combinations of signals $A_s(X)$.

7. The high resolution encoder of claim 1, wherein said variable property is one member of the group consisting of:
    a variable magnetic field intensity resulting from permanent magnets of different polarities disposed on the scale at several positions;
    a variable light intensity obtained by variable transparency or reflectivity of parts of the scale; and a number of light sources
    a variable light intensity obtained by variable distance between sensors and a number of light sources
    variable eddy current losses obtained by an irregular shape of a conducting part of the scale; and
    variable inductance obtained by a variable property of the rotor material magnetic properties.

8. The high resolution encoder of claim 1, being a rotary encoder, and wherein said relative position comprises a relative angle.

9. The high resolution encoder of claim 1, being a linear encoder, wherein one of the parts comprises a liner path or a curvilinear path and said relative position relates to a length along said linear or curvilinear path.

10. The high resolution encoder of claim 1, wherein the processor is configured to obtain an initial position estimate from a most recent previously known position.

11. The high resolution encoder of claim 1, wherein values of said vector function are held in a look-up table.

12. A high-resolution encoding method to measure and retrievably encode the relative position of a first part P with a second part S, the first part P and the second part S being movable with respect to one another, the method comprising:
   a) providing a variable property for sensing such that said variable property varies over a length of said first part P, said variable property being provided via sensible elements distributed over said length of said first part P;
   b) on said second part S, sensing said variable property at n discrete locations;
   c) outputting signals from said n discrete locations in accordance with said sensing;
   d) receiving said signals from each of said n discrete locations; and
   e) for succeeding ones of said relative positions forming a vector V having entries from each sensor respectively, thereby defining said relative positions respectively, the encoder thereby using said vector to measure and encode said relative position; and
   f) obtaining an initial position by scanning for all possible positions until a position at which the vector function satisfies a condition $$N[Vc(X)-V]<\Delta$$

is found, wherein $\Delta$ is a predetermined threshold, N is a normalization function, Vc(X) is the vector of values of the analog output at position X retrieved from tables of pre-recorded data, said position satisfying said condition being usable to track said relative position.

13. The high resolution encoding method of claim 12, further comprising digitizing said signals from said n sensors prior to providing said signals to said processor.

14. The high resolution encoding method of claim 12, comprising inputting said signals to the said processing unit as a vector $V(X)=\{ \ldots, A_s(X), \ldots \}$ with $s \in \{1 \ldots n\}$.

15. The high resolution encoding method of claim 14, comprising inserting said respective vector into an n vector function $V(X)=\{ \ldots, A_s(X), \ldots \}$ of the relative position X of the said P part with the said S part.

16. The high-resolution encoding method of claim 15, wherein said vector function V(X) is selected to fulfil two mathematical conditions:
   first mathematical condition_There is a one to one (injective) relation between X and V(X), so that a vector value V(X) obtained at a position X is characteristic of that position,
   second mathematical condition_There exists a threshold $\Delta$ such that for any two positions X1 and X2, there exists a norm $N[V(X_1), V(X_2)]$ and a function $F[V(X_1), V(X_2)]$ such that
   Either $$N[V(X_1),V(X_2)]<\Delta$$

Or
   The function $F(X)=F[V(X_1), V(X_2)]$ is monotonous over a predetermined interval $X1 \leq X \leq X2$.

17. The high resolution encoding method of claim 16 wherein the vector function V(X) is of size p and has components $V(X)=\{ \ldots, B_t(X), \ldots \}$ with $t \in \{1 \ldots p\}$, wherein the components $B_t(X)$ are mathematical combinations of signals $A_s(X)$.

18. The high resolution encoding method according to claim 12, wherein said variable property is one member of the group consisting of:
   a variable magnetic field intensity resulting from permanent magnets of different polarities disposed on the scale at several positions;
   a variable light intensity obtained by variable transparency or reflectivity of parts of the scale; and a number of light sources
   a variable light intensity obtained by variable distance between sensors and a number of light sources; variable eddy current losses obtained by an irregular shape of a conducting part of the scale; and
   variable inductance obtained by a variable property of the rotor material magnetic properties.

19. The high resolution encoding method of claim 16, comprising carrying out a function search for a vector function, the function search comprising:
   selecting locations on said part P and placing or simulating sensible elements at said locations on said part P;
   selecting locations on said part S and placing or simulating sensors at said locations on said part S;
   calculating or providing signals from each sensor; and
   testing said signals to provide a candidate vector function that fulfills said conditions; and
   accepting said candidate vector function if said conditions are fulfilled and repeating said function search if said conditions are not fulfilled.

20. The high resolution encoding method of claim 12, wherein said relative position comprises a relative angle.

21. The high resolution encoding method of claim 12, wherein one of the parts comprises a liner path or a curvilinear path and said relative position relates to a length along said linear or curvilinear path.

22. The high resolution encoding method of claim 12, comprising obtaining an initial position estimate from a most recent previously known position.

23. The high resolution encoding method of claim 12, comprising obtaining values of said vector function from a look-up table.

24. The high resolution encoding method of claim 16, comprising carrying out an initialization procedure, the initialization procedure comprising compiling said vector function from said variable property.

25. The high resolution encoding method of claim 24, wherein said initiation procedure further comprises:
   selecting a candidate property and a variation for said variable property;
   using a simulation of said candidate property and said variation to set up said vector function; and
   verifying that said vector function fulfils said first and second conditions.

* * * * *